(12) United States Patent
Santos

(10) Patent No.: US 8,488,319 B2
(45) Date of Patent: Jul. 16, 2013

(54) MODULARLY CONSTRUCTED POWER CONVERTER ARRANGEMENT

(75) Inventor: Alfredo Santos, Cotia-Brasillien (BR)

(73) Assignee: Semikron Elektronik GmbH & Co. KG, Nürnberg (DE)

( * ) Notice: Subject to any disclaimer, the term of this patent is extended or adjusted under 35 U.S.C. 154(b) by 265 days.

(21) Appl. No.: 12/948,554

(22) Filed: Nov. 17, 2010

(65) Prior Publication Data

US 2011/0122669 A1     May 26, 2011

(30) Foreign Application Priority Data

Nov. 17, 2009   (DE) .......................... 10 2009 053 583

(51) Int. Cl.
*H05K 7/20*     (2006.01)
(52) U.S. Cl.
USPC ............ 361/695; 361/704; 361/719; 363/141
(58) Field of Classification Search
None
See application file for complete search history.

(56) References Cited

U.S. PATENT DOCUMENTS

| | | | | |
|---|---|---|---|---|
| 5,930,112 A * | 7/1999 | Babinski et al. | ............... | 361/695 |
| 6,091,604 A * | 7/2000 | Plougsgaard et al. | ........ | 361/707 |
| 6,515,858 B2 * | 2/2003 | Rodriguez et al. | ............ | 361/695 |
| 7,139,170 B2 * | 11/2006 | Chikusa et al. | ................ | 361/695 |
| 7,205,740 B1 * | 4/2007 | Wei et al. | ....................... | 318/473 |
| 7,372,696 B2 * | 5/2008 | Kauranen et al. | ............. | 361/692 |
| 7,616,442 B1 * | 11/2009 | Kaveh | ........................... | 361/697 |
| 8,144,466 B2 * | 3/2012 | Kishimoto et al. | ........... | 361/695 |
| 2002/0026996 A1 * | 3/2002 | Krieger et al. | ................... | 165/47 |
| 2009/0065174 A1 * | 3/2009 | Lai et al. | ...................... | 165/80.3 |

* cited by examiner

*Primary Examiner* — Boris Chervinsky

(74) *Attorney, Agent, or Firm* — The Law Offices of Roger S. Thompson

(57) ABSTRACT

A modularly constructed power converter arrangement has two end-side elements and at least one power converter module arranged therebetween. One end-side element has, a fan of an air cooling device, while the other end-side element has, aligned with the fan, cutouts acting as air passages. At least one end-side element has an electrical connection device. The at least one power converter module has, as part of the cooling device, a heat sink, through which air can flow from one end-side element to the other and on which is arranged at least one power semiconductor module connected to a control device and to a capacitor device. For this purpose, the at least one power converter module has a housing, which is open at the end sides and which can be connected in each case at the end sides to an end-side element or a further power converter module.

8 Claims, 5 Drawing Sheets

MODULARLY CONSTRUCTED POWER CONVERTER ARRANGEMENT

BACKGROUND OF THE INVENTION

1. Field of the Invention

The invention is directed to a power converter arrangement such as can be used on machine tools, for example, for the rotational-speed-regulated drive of electric motors used therein. A large number of different types of power converters can be constructed with the inventive modularly constructed power converter arrangement. They include, in particular, rectifiers, inverters and frequency converters. Moreover, the number of phases of the respective power converters is not absolute. Particularly preferably, these power converter arrangements are used for powers of the orders of magnitude of 10 kW and 100 kW.

2. Description of the Related Art

Power converter arrangements generally known for this power class include, on the one hand, completely prefabricated power converter arrangements or, on the other hand, customized solutions specifically adapted to a task.

SUMMARY OF THE INVENTION

It is an object of the invention to provide a power converter arrangement which is constructed modularly and can therefore easily be adapted to the function and/or power required of a particular application, without requiring a large number of different basic elements.

The invention is directed to a power converter module comprising a housing which is open at both end sides, and two end-side elements. At least one of the power converter modules is arranged between the two end-side elements. In this case, the at least one power converter module has, as part of the cooling device of the power converter arrangement, a heat sink, through which flow can take place from the first to the second end-side element.

At least one power semiconductor module is arranged in a circuit- and power-conforming fashion on the heat sink. In this case, the arrangement can consist, for example, of a plurality of power semiconductor modules of identical type which form half-bridges and which, connected accordingly, form a three-phase inverter.

The at least one power semiconductor module is connected to a control device, which is likewise arranged in the interior of the housing, and also to a capacitor device. The capacitor device preferably consists of two capacitor banks, which are arranged in a mirror-inverted fashion with respect to one another on a dedicated printed circuit board. The capacitor device is connected to the power semiconductor modules in a circuit-conforming fashion. It is furthermore preferred to arrange, from an end-side consideration, one capacitor bank alongside the heat sink, and a further capacitor bank alongside the at least one power semiconductor module, thus resulting in a very compact construction overall. In this case, it is likewise possible and expedient from a circuitry standpoint to arrange the control device directly above the at least one power semiconductor module.

The housing, open at the end sides, can be connected, at its respective end side, to an end-side element, or to a further power converter module. For this purpose, the housing is preferably embodied as a U-shaped base housing with a matched cover. For connection to an end-side element, or to a further housing, the U-shaped base housing has mating connectors at the end sides at the side walls.

This construction gives rise to the modularly constructed power converter arrangement comprising a first end-side element and at least one power converter module. The power converter modules differ in terms of their internal circuitry, whereby rectifiers, or inverters, for example, are formed, and alternatively, or simultaneously, also in terms of the length of the respective housing. The length of the housing preferably scales on account of the required cooling capacity or on account of the required capacitance of the capacitor device. In this case, it is preferred if a limited selection of housings having different lengths is provided.

Furthermore, two end-side elements are provided, each having dedicated parts of the cooling device of the power converter arrangement. For this purpose, a first end-side element has at least one fan for the cooling device embodied as an air cooling device. The second end-side element has, in alignment with the at least one fan, a plurality of cutouts acting as air passages. Consequently, cooling air can flow through the power converter arrangement from one end side to the other end side by means of the fans, and cool the power semiconductor modules by means of the heat sinks.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
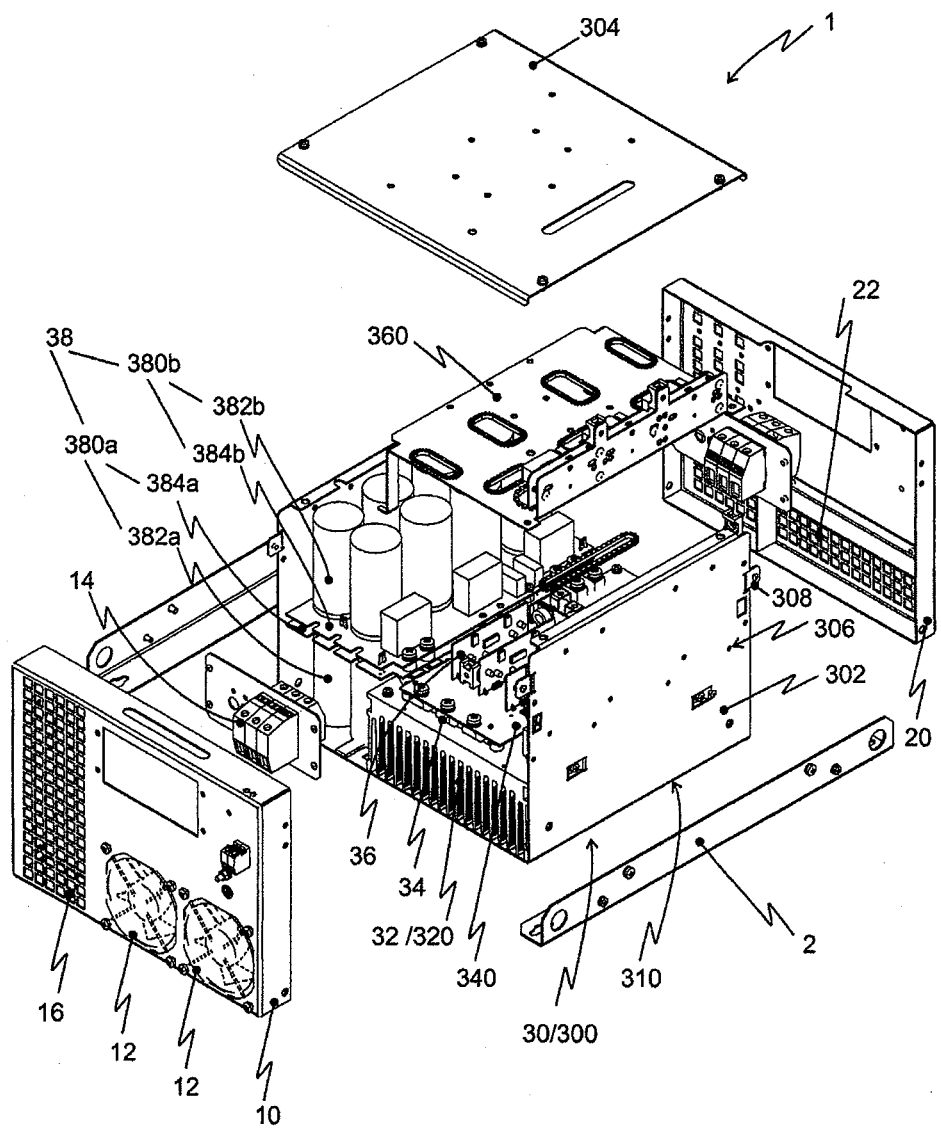
FIG. 1 shows a three-dimensional exploded view of a first embodiment of the inventive power converter arrangement.

FIG. 1 shows a three-dimensional exploded view of a first embodiment of an inventive power converter arrangement 1. The illustration shows a first end-side element 10 having cutouts 16 for the general cooling of power converter arrangement 1, specifically of a control circuit thereof. Furthermore, first end-side element 10 has two fans 12 and an electrical connection device 14. In this case, without restricting the generality, this connection device has three screw connection devices for the external connection of, for example, a three-phase AC motor.

Fans 12 serve for feeding cooling air to the interior of power converter arrangement 1. The latter is furthermore embodied here with a power converter module 30 following first end-side element 10 with a second end-side element 20 wherein the latter has a plurality of cutouts 22 aligned with the position of fans 12 in first end-side element 10.

Power converter module 30 has a heat sink 32 as part of a cooling device of power converter arrangement 1, which is formed moreover by fans 12 of first end-side element 10 and air passages 22 of second end-side element 20. In this case, cooling ribs 320 of heat sink 32 are arranged in such a way that the cooling air can flow through power converter arrangement 1 from first end-side element 10 to second end-side element 20. For this purpose, heat sink 32 is arranged in a housing 300 of power converter module 30 in alignment with fans 12 and air passages 22.

Housing 300 of power converter module 30 is open at its end sides and moreover consists of a U-shaped base housing 302 having a base area 310, and of a matched cover 304. In this case, base housing 302 has fixing elements for fixing components 32, 34, 38 of the power converter circuit, and connection elements 308 for respective end-side connection to an end-side element 10, 20, or to a further base housing 300 of an adjacent power converter module 30. Connection elements 308 are embodied as lugs having cutouts which engage in areas or lugs of end-side elements 10, 20, or further base housing 300 to be connected and are fixed there by any suitable means, such as screws or rivets.

End-side elements 10, 20 thus form with housing 300 of power converter module 30 the overall housing of power converter arrangement 1, and are preferably also arranged on two angular rails 2 at their lower outer edges. By means of angular rails 2, power converter arrangement 1 can be simply connected to a larger unit, for example to a switchgear cabinet.

In base housing 300 of power converter module 30, heat sink 32 is arranged on base area 310 in such a way that, from the viewing direction of end-side elements 10, 20, laterally a region also remains free for a capacitor device 38. The at least one power semiconductor module 34 is assigned to capacitor unit 38 and arranged on heat sink 32. The type and interconnection of power semiconductor modules determine the functionality of power converter module 30. For known and preferred three-phase operation, it is advantageous to arrange three power semiconductor modules 34 of identical type and to connect them to one another and to capacitor device 38 in a circuit-conforming fashion by means of a connection device 340. A control device 36 for driving power semiconductor modules is arranged on connection device 340 and connected in a circuit-conforming fashion and with short line paths.

Capacitor device 38 itself consists of two capacitor banks 380a/b. First capacitor bank 380a is arranged alongside heat sink 32 in base housing 300. Individual capacitors 382a are connected to one another by a printed circuit board 384a. Furthermore, printed circuit board 384a is connected integrally or in a multipartite fashion to connection device 340 or directly to power semiconductor modules 34 in a low-inductance manner. Second capacitor bank 380b is advantageously arranged in a mirror-inverted manner with respect to first capacitor bank 380a, in which case respective printed circuit boards 384a/b then face one another.

It is furthermore possible to arrange a customer-specific additional circuit board 360, which may be arranged above power semiconductor modules 34 and control device 36 for driving the power semiconductor components of the power semiconductor modules, this configuration imparts additional functionality to the inventive power converter module.

Figure 2:
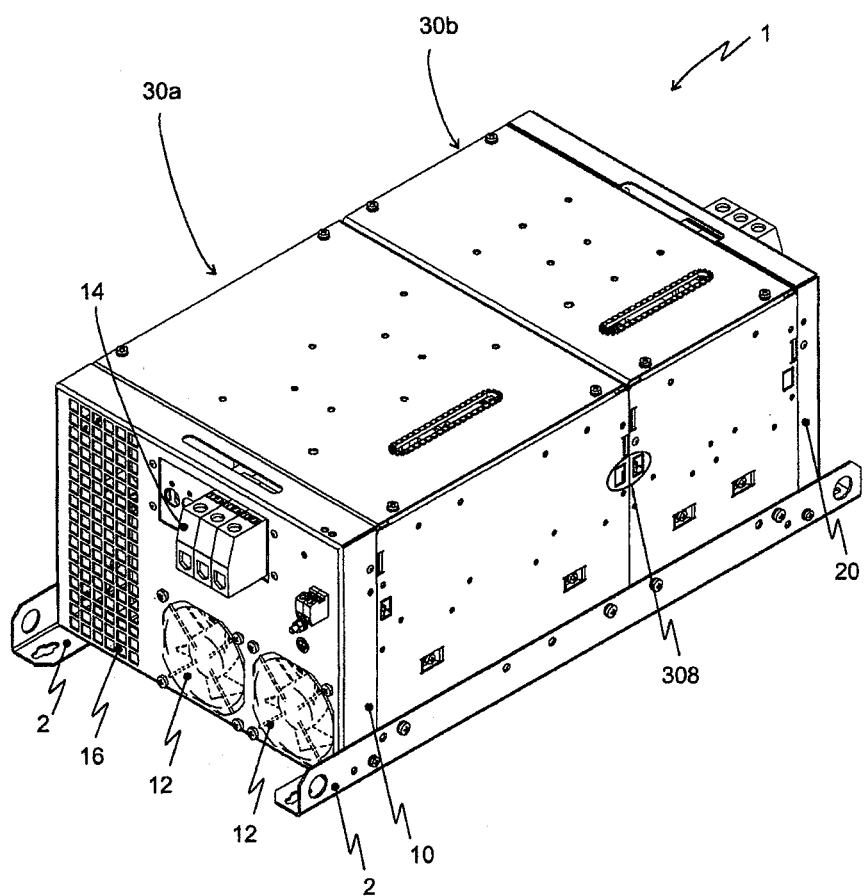
FIG. 2 shows a three-dimensional view of a second embodiment of the inventive power converter arrangement.

FIG. 2 shows a three-dimensional view of a second embodiment of power converter arrangement 1. For this purpose, two power converter modules 30a/b having different lengths are jointly connected to a respective first and second end-side element 10, 20. Connection means 308 described above are used for this purpose.

The different lengths of the two power converter modules 30a/b result here from the different power, and hence the different cooling, requirements of the respectively incorporated power semiconductor modules that are connected to form different circuits. By virtue of these different lengths of respective power converter modules 30a/b, the latter are particularly advantageously adapted to the required power, as a result of which only that structural volume which is actually necessary from a circuitry standpoint is required. It is likewise advantageous for the modular construction to provide a plurality, but a limited number, of housings of different lengths, in particular since a doubled power can be simply obtained by combining two identical power converter modules 30a/b.

Figure 5:
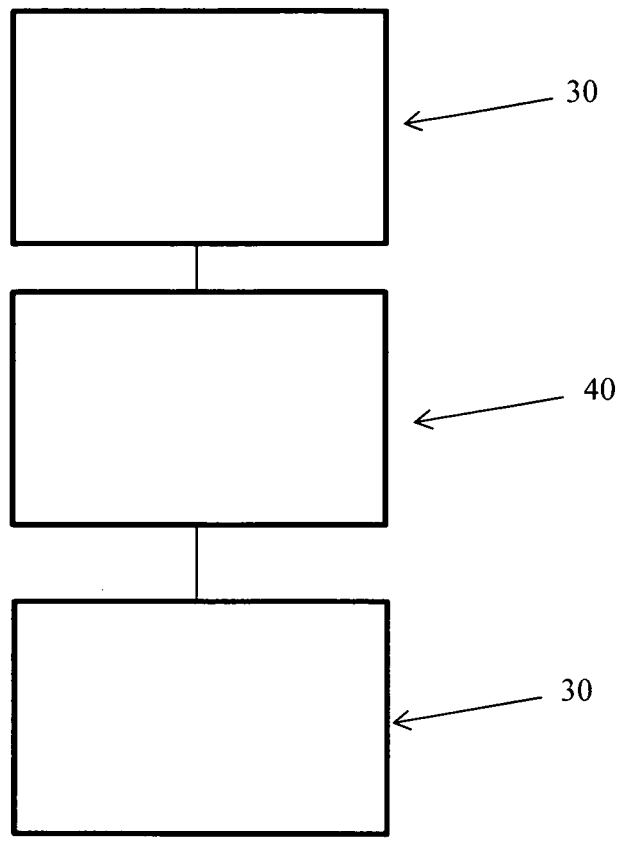
FIG. 5 is a schematic diagram of two inventive power converter arrangements with a functional unit therebetween.

In this case, however, as illustrated in FIG. 5, it can also be advantageous to distribute its functional units, such as, for example, a three-phase bridge circuit 40, between two power converter modules 30. This can be effected by virtue of the fact that two identical power converter modules 30 each comprise two power semiconductor modules, three being used for the three-phase bridge circuit and the fourth being used for a further functionality. Consequently, the advantages of the modular construction can be increased even further.

Figure 3A:
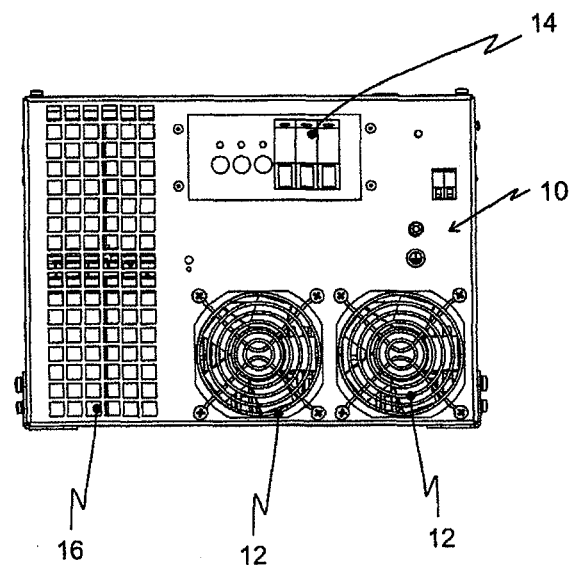
FIGS. 3a and 3b show front and back plan views of an end-side element of the inventive power converter arrangement.
Figure 3B:
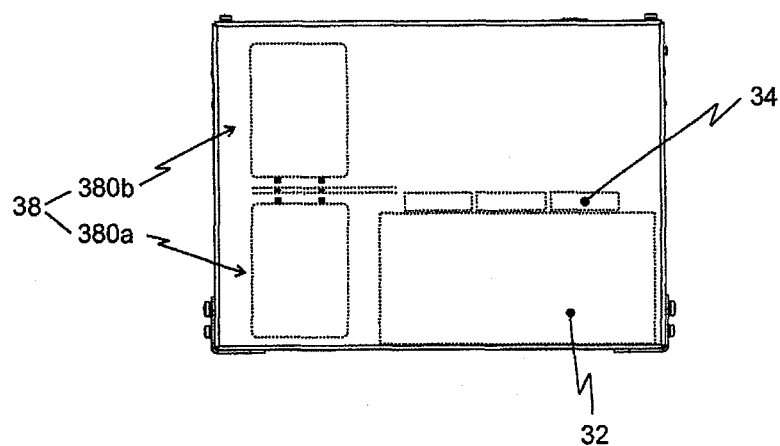

FIG. 3 shows a plan view of an end-side element 10 of a power converter arrangement 1 such as has already been illustrated in FIGS. 1 and 2. FIG. 3a illustrates cutouts 16, embodied as cooling air inlets, fans 12 and connection devices 14, while FIG. 3b illustrates a virtual view into the interior, which schematically shows the position of heat sink 32, of capacitor banks 380a/b of capacitor device 38, and three power semiconductor modules 34.

Figure 4:
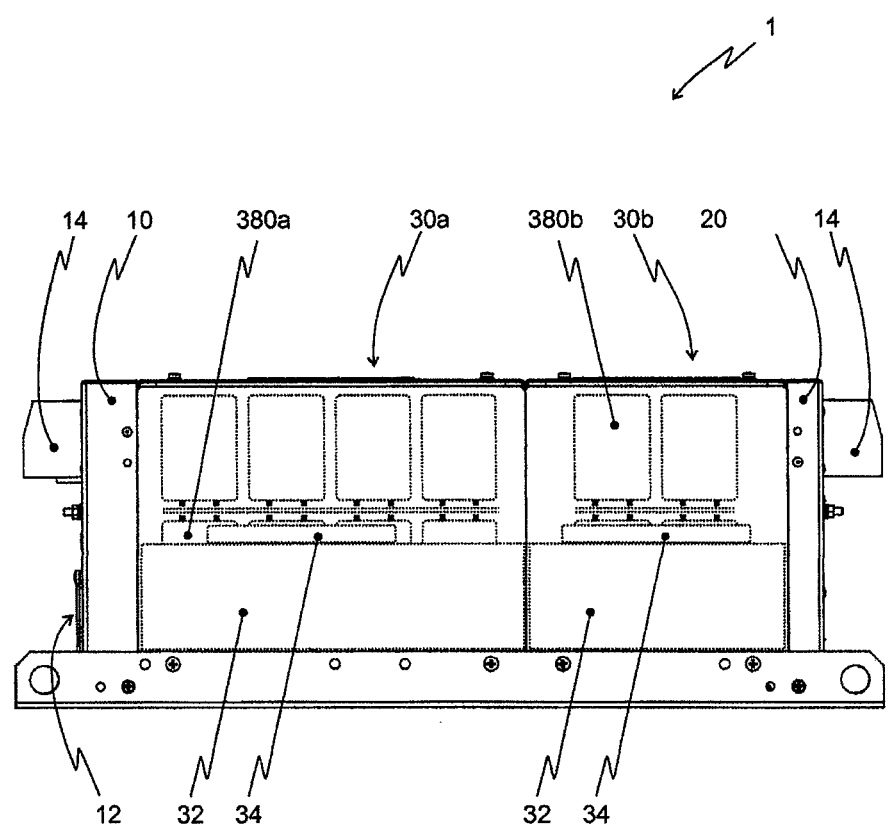
FIG. 4 shows a lateral plan view of the inventive power converter arrangement.

FIG. 4 shows a lateral plan view of a power converter arrangement 1 such as is also illustrated in FIG. 2. A virtual view into the interior of power converter modules 30a/b is likewise indicated here. The illustration schematically shows here, from a lateral view, the position of two heat sinks 32 with power semiconductor modules 34 and the position of capacitor banks 380a/b of capacitor device 38.

Adjacent power converter modules 30a/b are advantageously connected to one another by means of cable connections (not illustrated) arranged in a closely adjacent fashion. The connection of end-side elements 10, 20 to connection devices 14 is formed in the same way.

Power converter arrangement 1 provides its advantage by reason of the modular construction thereof with a small number of housings 300 for power converter modules 30, with different lengths. Thus, with at the same time flexible and nevertheless compact internal configuration, it is possible to form in each case a power converter arrangement with optimum power in conjunction with desired functionality.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A modularly constructed power converter arrangement comprising:
   a first and a second end-side element;
   at least one power converter module arranged between said first and second end-side elements;
   a fan of an air cooling device disposed on said first end-side element;
   said second end-side element having a plurality of cutouts therein acting as air passages in alignment with said fan; and
   a heat sink through which flow can take place from said first to said second end-side element and on which is arranged at least one power semiconductor module connected to a control device and to a capacitor device;
   wherein said capacitor device consists of two capacitor banks arranged in a mirror-inverted fashion with respect to one another;
   wherein one capacitor bank is arranged, from an end-side consideration, laterally alongside said heat sink and said further capacitor bank is arranged alongside said power semiconductor module;
   wherein at least one of said first and second end-side elements has an electrical connection device; and
   wherein said at least one power converter module has a housing, which is open at said end sides and which is adapted to be connected at said end sides to at least one of an end-side element and a further power converter module.

2. The power converter arrangement of claim 1, wherein each capacitor of said capacitor banks is arranged on a printed circuit board.

3. The power converter arrangement of claim 1, wherein a functional unit is distributed between two power converter modules.

4. The power converter arrangement of claim 1, wherein said housing includes a U-shaped base housing and a mating cover.

5. The power converter arrangement of claim 1, wherein said housing has a length that is dependent on at least one of the necessary cooling capacity of said power semiconductor modules or the capacitance of said capacitor device.

6. The power converter arrangement of claim 4, wherein the U-shaped base housing has at the end sides at the side walls connection means of identical type for respective connection to at least one of an end-side element and a further U-shaped base housing.

7. The power converter arrangement of claim 4, wherein said heat sink is arranged on said base area and said cooling ribs extend from one end side to said other end side.

8. The power converter arrangement of claim 1, wherein said control device is arranged directly above said at least one power semiconductor modules.

* * * * *